United States Patent

[11] 3,631,796

[72] Inventor Patrick Hastings
Merrick, N.Y.

[21] Appl. No. 854,228
[22] Filed Aug. 29, 1969
[45] Patented Jan. 4, 1972

[73] Assignee Audrey J. Hastings
Merrick, N.Y.

[54] SELECTIVE VACUUM BLOCKOUT MEANS ON WORK SUPPORT TABLES IN SILK SCREEN APPARATUS
3 Claims, 4 Drawing Figs.

[52] U.S. Cl. .......... 101/126, 101/407, 269/21
[51] Int. Cl. .......... B41f 15/20
[50] Field of Search .......... 101/126, 407, 123, 114; 271/74; 269/21

[56] References Cited

UNITED STATES PATENTS

| | | | |
|---|---|---|---|
| 953,941 | 4/1910 | Borgfeldt .......... | 269/21 |
| 2,782,574 | 2/1957 | Copold .......... | 269/21 X |
| 2,987,314 | 6/1961 | Monaghan .......... | 271/74 |
| 3,390,876 | 7/1968 | Clem .......... | 271/74 X |
| 3,453,957 | 7/1969 | Hamilton .......... | 101/407 X |
| 3,489,405 | 1/1970 | Abramson et al. .......... | 269/21 |
| 3,505,951 | 4/1970 | Gartrell .......... | 101/126 X |

*Primary Examiner*—William B. Penn
*Attorney*—Allison C. Collard

ABSTRACT: A silk screen printing apparatus which consists of a worktable provided with a plurality of holes which are connected to a source of vacuum for holding down a flexible workpiece. Spanning across the worktable is a vacuum blockout consisting of a flat slider which selectively covers over portions of the vacuum bed underneath the workpiece, so that the workpiece will be slightly raised in elevation underneath the slider due to the release in vacuum on that portion of the workpiece, and the thickness of the slider. A silk screen can then be lowered over the worktable and will contact only that portion elevated by the vacuum blockout slider.

INVENTOR.
PATRICK HASTINGS

BY [signature]

ATTORNEY

INVENTOR.
PATRICK HASTINGS
BY [signature]
ATTORNEY

SELECTIVE VACUUM BLOCKOUT MEANS ON WORK SUPPORT TABLES IN SILK SCREEN APPARATUS

This invention relates to an improved silk screen printing apparatus which permits the selective placement of printed material on to a flexible workpiece.

More specifically, the present invention relates to a silk screen printing apparatus which includes a vacuum worktable having a sliding vacuum blockout for disposal between the vacuum bed of the table and the workpiece, to selectively raise portions of the workpiece for contact with a silk screen.

In the printing of flexible substrates by silk screen processes, it is common to employ a worktable which is provided with a plurality of surface holes connected to a vacuum source for holding down the workpiece. In conventional devices, the workpiece is generally held flat so that all portions of its surface are contacted simultaneously by a silk screen containing a printed message or advertisement. In some applications, it is advisable to print only certain portions of the workpiece at any given time. When the workpiece is held substantially flat on the vacuum worktable, it has been found difficult to selectively contact only certain portions of the workpiece with the silk screen, while leaving other portions untouched. In certain printing applications, it has been found desirable to use a plurality of silk screens containing specified indicia or format which may be useful on only a selected portion of the workpiece. By combining selected letters, numbers, or designs from different areas of silk screens, it is possible to put together a completed design on the workpiece from a plurality of previously formed silk screen masters.

Accordingly, the present invention provides a silk screen printing apparatus which includes a vacuum-type worktable as well as a vacuum blockout which is capable of selectively covering over portions of the vacuum holes underneath the workpiece so that the workpiece will be raised slightly in elevation for selective contact with the silk screen. The vacuum blockout consists of a flat slider which is placed between the vacuum bed of the worktable and the flexible workpiece and can be positioned at any location across its surface. In a preferred embodiment of the invention, the vacuum blockout is connected to a rack and pinion drive so that it may be easily positioned and located for good registration under a selected portion of the workpiece prior to printing by the silk screen.

It is, therefore, an object according to the present invention to provide a silk screen printing apparatus which permits selected portions to be printed by a silk screen while leaving the remainder of the workpiece untouched.

It is another object according to the present invention to provide a silk screen printing apparatus which is simple in design, easy to manufacture, and reliable in operation.

Other objects and features of the present invention will become apparent from the following detailed description considered in connection with the accompanying drawings which disclose one embodiment of the invention. It is to be understood, however, that the drawings are designed for the purpose of illustration only and not as a definition of the limits of the invention.

In the drawings, wherein similar reference characters denote similar elements throughout the several views.

Figure 1:
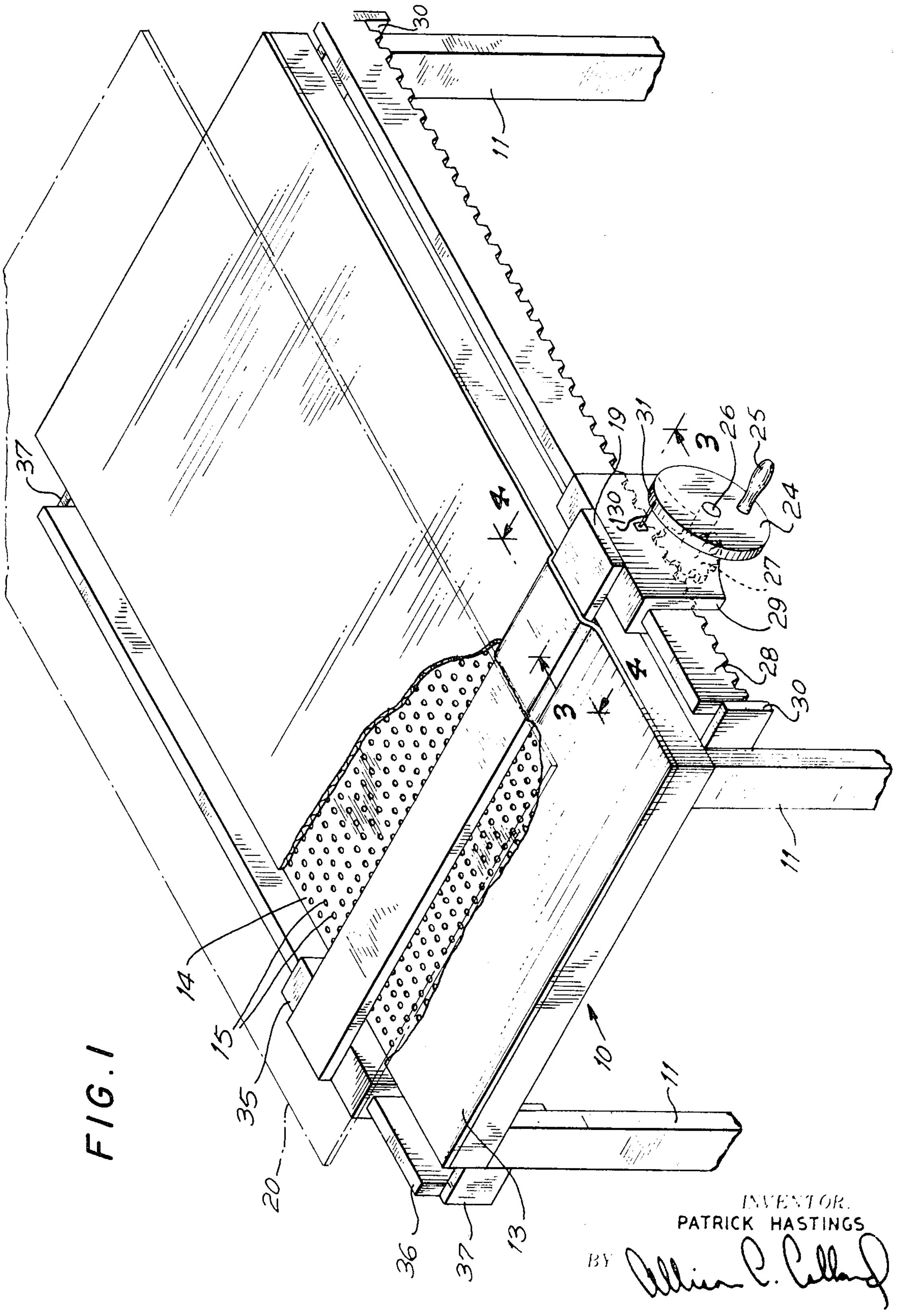
FIG. 1 is a perspective view of the silk screen printing apparatus according to the invention.
Figure 2:
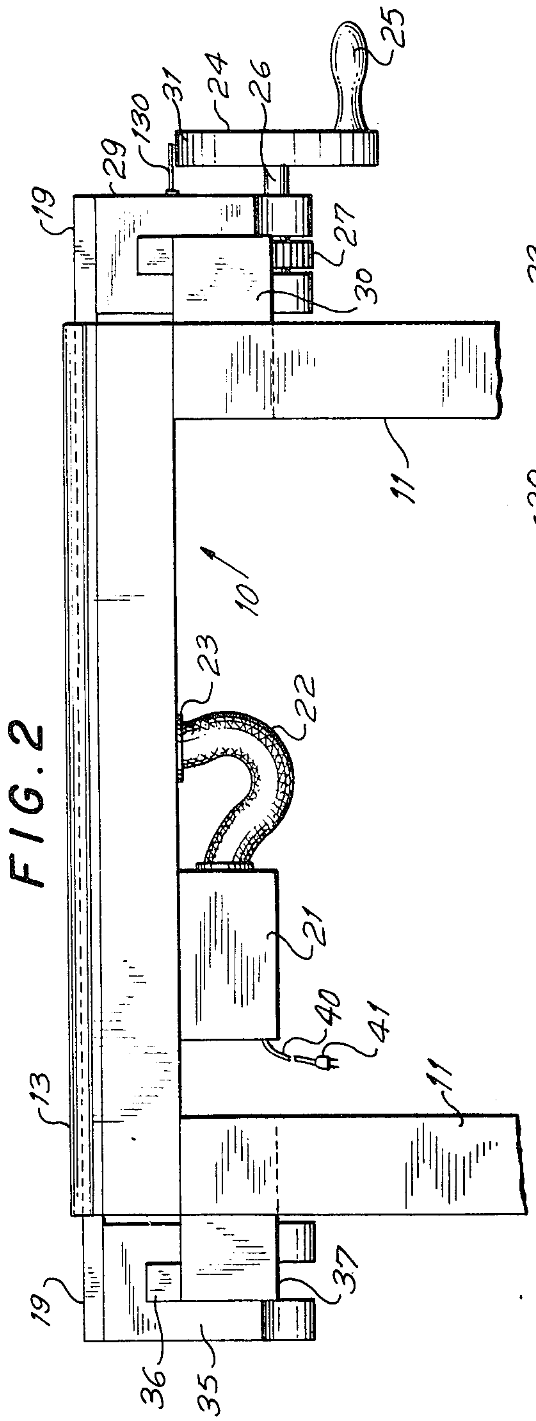
FIG. 2 is an end view taken along one end of the apparatus.

Referring to FIGS. 1–4, there is shown the silk screen printing apparatus according to the invention including a table generally designated as 10, having supporting legs 11 secured to each of the corners of table 10 so as to elevate the surface of the table to a convenient working height. The surface of table 10 includes a vacuum bed 14 having a multiplicity of holes 15 which are communicative to a vacuum chamber 16 disposed below vacuum bed 14. Vacuum chamber 16 is closed by means of floor partition 17 and sidewalls 18. A conventional pump 21 is coupled through flexible hose 22 into coupling 23 through the bottom of floor 17. When vacuum pump 21 is operated by means of connecting its line cord 40 through plug 41 to a conventional outlet, a source of vacuum is maintained within chamber 16 so as to provide a source of suction through holes 15 mounted on vacuum bed 14. When workpiece 13, which may consist of a flexible substrate material such as paper, plastic, foil or other material which is capable of receiving silk screen printing, is disposed on vacuum bed 14, the vacuum will maintain workpiece 13 securely to the bed in order to facilitate printing. Disposed across the bed is a vacuum blockout 19 which consists of a flat-sliding element for covering over selected vacuum holes 15 across the surface of the vacuum bed. Vacuum blockout 19 may be constructed from a thin flat material such as plastic or sheet metal. Blockout 19 may be secured at each end to U-shaped carriages 29 and 35. Carriage 29 is adapted for sliding on the top portion of a rack 28 which is secured between two extending supports 30 projecting from beneath table 10, and secured to legs 11. The bottom portion of rack 28 includes a toothed surface for engagement with a correspondingly pitched pinion gear 27 which is secured to axle 26 mounted through U-shaped carriage 29. The end of axle 26 is secured to a manually operated drive wheel 24 for movement with handle 25. Handle 25 is secured near the periphery of wheel 24 by means of bolt 32. Along the peripheral surface of wheel 24 are included a plurality of calibration marks. A pointer 130 which secured along the side of the U-shaped carriage 29 projects over these calibration marks to permit the accurate positioning of blockout 19 with respect to workpiece 13.

U-shaped carriage 35, connected to the other end of blockout 19, is slidably disposed on rail 36 which is secured between projecting supports 37 connected to legs 11 on the other side of table 10. Blockout 19 may be moved to any desired position on vacuum bed 14 by rotating wheel 24 which in turn rotates pinion 27 to advance carriages 29 and 35 along rack 28 and rail 36.

Figure 4:
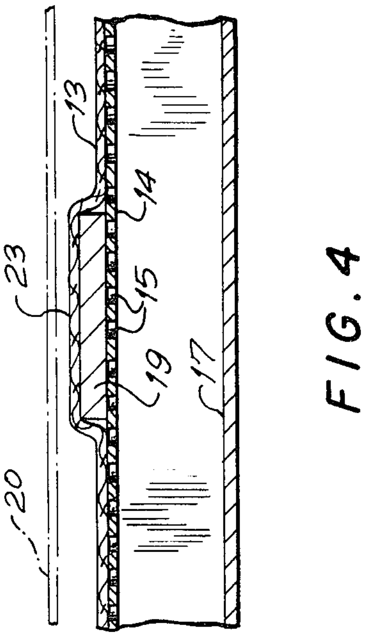
FIG. 4 is a cross-sectional view taken along section 4—of FIG. 1.
Figure 3:
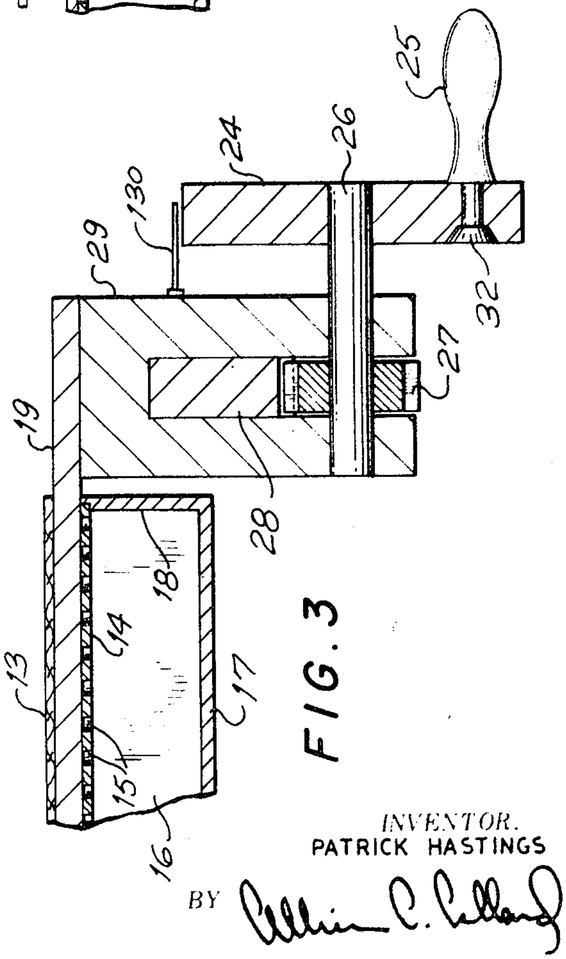
FIG. 3 is a cross-sectional view taken along section 3—3 of FIG. 1.

As shown in detail in FIG. 4, vacuum blockout 19 which, for the purposes of illustration, is shown with an exaggerated height, not only blocks the vacuum produced by vacuum holes 14 disposed immediately below, but dimensionally elevates the surface 23 of workpiece 13 over a selected area of the table. This permits silk screen 20, as shown in dotted line, to be lowered over workpiece 13 and contact only its raised surface 23, while leaving its remaining portion untouched.

In the silk screen printing of workpieces, this vacuum blockout allows the printer to make use of only certain indicia or designs, and accurately print these on selected locations on the workpiece so that the finished design will consist of a composite of several designs and indicia taken from selected silk screens which are part of the inventory of the printer. The speed resulting from the use of the vacuum blockout, and its simplicity, greatly reduces the cost in producing the finished workpiece.

While only a single embodiment of the present invention has been shown and described, it will be obvious that many changes and modifications may be made thereunto without departing from the spirit and scope of the invention.

What is claimed is:

1. In a silk screen printing apparatus including a silk screen, a worktable having a plurality of surface apertures connected to a vacuum source for creating a vacuum on the surface of the table for holding down a flexible workpiece disposed substantially across the entire table, and a vacuum blockout means for covering over selected portions of the table, the improvement comprising;

at least one thin sliding strip member disposed across the width of the table for disposal between the vacuum surface of the table and a portion of the workpiece for raising slightly in elevation a selected portion of the workpiece, so that the elevated portion of the workpiece is contacted by the silk screen during printing while the remaining portion of the workpiece is held down on the worktable by the vacuum source, and means for positioning said blockout means along the length of the surface of the table.

2. The silk screen apparatus as recited in claim 1 herein said means for positioning said blockout means comprises a rack secured along the length of the table, a pinion secured to one end of said sliding member, and a drive wheel secured to said pinion so as to enable movement of said slidable blockout means by rotation of said drive wheel.

3. The silk screen apparatus as recited in claim 2, wherein said rack and pinion further comprises a pointer secured to said sliding blockout means over said drive wheel and a plurality of calibration marks disposed on the peripheral surface of said drive wheel for calibrating the position of said sliding blockout means with respect to the surface of the table.

* * * * *